United States Patent [19]

Kurauchi et al.

[11] Patent Number: 4,563,372

[45] Date of Patent: Jan. 7, 1986

[54] TOP COAT COMPOSITION CONTAINING MICROGEL PARTICLES

[75] Inventors: Takeo Kurauchi, Neyagawa; Keizou Ishii, Ashiya; Atsushi Yamada, Nishinomiya; Jun Nozue, Hirakata, all of Japan

[73] Assignee: Nippon Paint Co., Ltd., Osaka, Japan

[21] Appl. No.: 647,499

[22] Filed: Sep. 5, 1984

[30] Foreign Application Priority Data

May 25, 1984 [JP] Japan ................................ 59-107220
Aug. 3, 1984 [JP] Japan ................................ 59-164082

[51] Int. Cl.$^4$ ......................... B05D 1/36; C08L 67/08
[52] U.S. Cl. .................................... 427/409; 427/379; 427/407.1; 427/388.2; 427/388.3; 427/388.5; 427/421; 428/458; 428/460; 428/463; 525/123; 525/127; 525/155; 525/162; 525/163

[58] Field of Search ............... 525/162, 163, 155, 166, 525/123, 127; 427/421, 407.1, 379, 388.2, 388.3, 388.5, 409

[56] References Cited

U.S. PATENT DOCUMENTS

| | | | |
|---|---|---|---|
| 4,025,474 | 5/1977 | Porter, Jr. et al. | 525/443 |
| 4,242,384 | 12/1980 | Andrew et al. | 525/443 |
| 4,377,661 | 3/1983 | Wright et al. | 525/303 |
| 4,477,536 | 10/1984 | Wright et al. | |

*Primary Examiner*—Theodore E. Pertilla
*Attorney, Agent, or Firm*—Millen & White

[57] ABSTRACT

A clear or colored top coating composition containing internally cross-linked microgel particles is disclosed. The microgel particles are produced by emulsion-polymerizing a monomer mixture of ethylenically unsaturated monomers including at least one cross-linking monomer and have a refraction index which is equal or close ($\leq 0.05$) to that of a surrounding film-forming polymer fully cured with a cross-linking agent.

14 Claims, No Drawings

TOP COAT COMPOSITION CONTAINING MICROGEL PARTICLES

BACKGROUND OF THE INVENTION

This invention relates to top coat compositions containig microgel particles.

The exterior of automobiles and trucks, for example, are finished with a colored or pigmented coat with or without a clear coat over the color coat for decorative and protective purposes. In either case, the top coat, whether pigmented or not, must exhibit an excellent durability and appearance. As will be apparent, since the quality of the top coat directly affects the appearance of the entire finish, it has been a problem to improve the appearance of the top coat as much as possible.

One approach for solving this problem would be to make the top coat as thick as possible. However, with the conventional top coat compositions, the thickness of the finished films is limited to only 30–35 microns with a single coating operation, or 40–45 microns with two coating operations. This is because the conventional coating compositions tend to excessively run with an increase in the amount applied per unit area. Thick top coats may be provided by multiple coating operations but this greatly lowers productivity and requires an extensive modification of existing production lines.

In order to avoid undersirable run, very fine, generally spherical particles of a cross-linked polymer, generally known as microgel particles, may be incorporated onto a system comprising a film-forming polymer, a cross-linking agent and a liquid diluent. The system is imparted with a structural viscosity by the addition of the microgel particles and thus may be applied to a greater film thickness in a single application than is possible with the conventional system without appreciable run. See, Japanese Laid Open Patent Applications 49-97026 and 58-129065.

Experiments have shown, however, that systems containing the microgel particles do not necessarily improve the appearance of the top coat when applied to a greater film thickness and often tend to decrease the quality of the finish in terms of gloss or luster. This is particularly the case when the system is pigmented and applied to side portions of automobiles such as doors where the applied films are subjected to a shear force by gravity.

In order that a coating system containing microgel particles can exhibit its characteristics to the fullest extent, it is essential for the particles to be insoluble in their dispersing medium (consisting essentially of a film-forming polymer, a cross-linking agent thereof and an organic solvent). Thus the particles remain dispersed as such throughout the entire top coat after curing. In case of clear top coats, if the difference in refraction index between the microgel particles and their surrounding matrix is too great, irregular or random reflection will take place at interfaces therebetween. If such irregular reflection takes place, the top coat will look white and opaque thereby injuring the appearance of the entire finish.

Similarly, irregular reflection can take place in colored or pigmented top coats owing to a difference in refraction index. This is because a very thin clear layer free from pigment particles is formed adjacent the surface. According to our experiments, when the exterior of automobiles was coated with a conventional pigmented top coat system containing microgel particles to a fully cured film thickness which is about 20 microns greater than conventional, areas having poor gloss were observed on side portions such as doors.

It is for this reason that the previously cited Japanese Laid Open Patent Application 49-97026 suggests the combination of microgel particles and a film-forming polymer having substantially the same refraction index. The microgel particles used therein are produced by the non-aqueous dispersion (NAD) method wherein a mixture of ethylenically unsaturated comonomers including a cross-linking comonomer is polymerized in a non-aqueous organic solvent such as aliphatic hydrocarbon solvents in which the comonomers are soluble but the resulting polymer is insoluble in the presence of a stabilizing agent. This necessarily limits the selection of usable comonomers only to those having solubility parameters which are relatively different from those of the non-aqueous solvents.

Said Japanese Application 49-97026 further requires the refraction index of microgel particles to be substantially same as that of the main film-forming polymer. However, since it is not the film-forming polymer per se but its cross-linked products which surround the microgel particles in the finished state, the problem of poor appearance owing to irregular reflection to light by the top coat has not been fully overcome by this technique.

Accordingly, it is a principal object of the invention to provide a coating system containing microgel particles which may obviate the foregoing defects of known technique and which permits wide selection of microgel particles while upgrading the resulting finish when used as a top finish. Other objects and advantages of the present invention will become apparent as the description proceeds.

SUMMARY OF THE INVENTION

In accordance with the present invention, there is provided a coating composition for use as a top coat on a substrate comprising:
(a) a film-forming polymer having a plurality of cross-linkable functional groups,
(b) a volatile, organic liquid diluent capable of carrying said film-forming polymer,
(c) a cross-linking agent dissolved in said diluent, and
(d) microgel particles of 0.01 to 10 micron size of a cross-linked polymer which are insoluble in the mixture of said film-forming polymer, said diluent and said cross-linking agent but stably dispersible in said mixture, the proportion of said microgel particles ranging from 0.2 to 30% by weight of the total solid contents of said composition.

The invention is characterized by the improvement wherein said microgel particles are produced by emulsion-polymerizing a mixture of ethylenically unsaturated comonomers including at least one cross-linking comonomer having a formulation which is so preselected as to satisfy the relationship:

$$|nDd-nDf| \leq 0.05$$

wherein nDd is the refraction index of said microgel particles and nDf is the refraction index of a clear film formed from said film-forming polymer and said cross-linking agent.

The composition may further comprise suitable pigments to provide a color top coat.

The microgel particles employed in the composition of this invention are produced by emulsion-polymerizing said mixture of comonomers in a aqueous medium and then removing water from the resulting emulsion.

Water has a solubity parameter of about 23, which is far higher than those of aliphatic hydrocarbon solvents used in the NAD method and of the majority of organic polymeric substances. Therefore, it become possible by the use of the emulsion polymerization technique to produce those microgel particles which have never been produced by the NAD method because of their solubility or swellability in the non-aqueous organic solvent and which have optical and other characteristics varying over a quite wide range to match with a variety of film-forming polymers and cross-linking agents. Thus, the present invention enables these components to be selected to comply with various requirements while taking the advantage of microgel particles without compromising the appearance characteristics of the resulting coat. A further advantage of the present invention resides in the fact that it enables a high-solids coating system to be formulated so that a relatively thick coating film may be formed in a single application and the current demand for solvent reduction for environmental reasons may be met.

DETAILED DESCRIPTION OF THE INVENTION

Any known film-forming polymer having cross-linkable functional groups may be used. Examples thereof include acrylic copolymers, polyesters, alkyds and the like. Of course they must have a plurality of cross-linkable functional groups such as hydroxyl and carboxyl groups, and also exhibit, when formed in a cross-linked coating film, requisite protective and decorative characteristics such as wetherability, anti-solvent and anti-chemical properties, anti-impact property and so on. Preferably they have an acid number from 0.5 to 40, more preferably from 2 to 30, and a hydroxyl number from 40 to 200, more preferably from 50 to 150. If these values are too low, the density of cross-links is too low to give high strength and anti-solvent properties to the coating film. Conversely, if these values are excessive, the water-resistance of the resulting film decreases and blisters may be formed upon repeated wetting.

The term "polyester resin" refers to one which is conventionally used in the coating industry and which consists essentially of a condensate between a polyhydric alcohol and a polycarboxylic acid. Also included in this term are alkyd resins modified with higher fatty acid groups derived from natural or synthetic drying, semi-drying or non-drying oils. These polyester resins must have, as hereinbefore described, acid and hydroxyl numbers of a suitable range.

Examples of polyhydric alcohols which may be employed in the synthesis of polyester resins include ethylene glycol, propylene glycol, butylene glycol, 1,6-hexylene glycol, neopentyl glycol, glycerol, trimethylolpropane, trimethylolethane, pentaerythritol, di-pentaerythritol, tri-pentaerythritol, hexanetriol, oligomers of styrene and allyl alcohol (e.g. one commercially available from Monsanto Chemical Company under the name of HJ 100), polyether polyols derived from trimethylolpropane and ethylene oxide and/or propylene oxide (e.g. one commercially available under the name of Niax Triol) and the like.

Examples of polycarboxylic acids include succinic, adipic, azelaic, sebacic, maleic, fumaric, muconic, itaconic, phthalic, isophthalic, terephthalic, trimellitic, pyromellitic acids and their acid anhydrides.

Examples of oils from which higher fatty acids are derived include linseed oil, soybean oil, tall oil, dehydrated castor oil, fish oil, tung oil, safflower oil, sunflower oil and cotton seed oil. Preferably the oil length of oil-modified alkyd resins does not exceed 50%. In order to give an internal plasticity, polyester resins may include a monocarboxylic acid such as a $C_4$–$C_{20}$ saturated aliphatic monocarboxylic acid, benzoic acid, p-tert.-butylbenzoic acid and abietic acid.

Acrylic copolymers which may be used in the present invention as a cross-linkable film-forming polymer may be obtained by copolymerizing a mixture of an alkyl acrylate or methacrylate and a comonmer having a cross-linkable functional group by a conventional method. The mixture may also contain an ethylenically unsaturated monomer other than the above monomers.

Examples of preferable alkyl (meth)acrylates include methyl (meth)acrylate, ethyl (meth)acrylate, propyl (meth) acrylate, butyl (meth)acrylate and 2-ethylhexyl (meth) acrylate.

Examples of monomers having a cross-linkable group include acrylic acid, methacrylic acid, 2-hydroxyethyl (meth) acrylate, 2-hydroxypropyl (meth)acrylate, N-butoxymethyl(meth)acrylamide, glycidyl (meth)acrylate and the like.

Examples of other monomers which may be optionally present in the monomer mixture include vinyl acetate, acrylonitrile, styrene, vinyl toluene and the like. The monomer mixture may also contain a monomer which may catalyze the reaction between the film-forming polymer and the cross-linking agent. Usually acrylic or methacrylic acid is used for this purpose. Monomers having a sulfonic acid group such as 2-sulfoethyl methacrylate and maleic ester half esters such as butyl acid maleate may also be used.

The monomer mixture may be polymerized by any known method such as solution polymerization, non-aqueous dispersion polymerization or bulk polymerization. The emulsion polymerization followed by solvent substitution may also employed.

The film-forming polymers thus prepared may be present in the mixture of the organic liquid diluent and the cross-linking agent in the form of a solution, a stable dispersion, or both.

Examples of cross-linking agents used for cross-linking the film-forming polymers include polyisocyanates and aminoplast resins, e.g. condensates of formaldehyde and a nitrogen compound such as urea, thiourea, melamine, benzoguanamine and the like. $C_1$–$C_4$ alkyl ethers of these condensates may also be used. The proportion of the cross-linking agent may be from 5 to 50%, preferably 10 to 40% by weight of the combined solid contents of the film-forming polymer and the cross-linking agent.

The microgel particles may be prepared by emulsion-polymerizing a mixture of ethylenically unsaturated comonomers including at least one cross-linking comonomer in an aqueous medium by a conventional method, and then removing water from the emulsion by, for example, solvent substitution, centrifugation, filtering or drying. Any known emulsifier and/or dispersing agent may be used in the emulsion polymerization. Emulsifiers having amphoteric ionic groups are particularly preferable. When microgel particles are incorporated to a coating composition, the structural viscosity imparted by the microgels may vary with the particle size of microgels. It is for this reason that the microgels should have a particle size distribution as uniform as possible. This may be easily accomplished by the use of an emulsifier having amphoteric ionizable groups.

Examples of ethylenically unsaturated comonomers used for the production of microgels include methyl (meth) acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth) acrylate and the like. Two or more comonomers may be combined.

Cross-linking comonomers include a monomer having at least two ethylenically unsaturated bonds in the molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include, ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addiiton to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth) acrylate, hydroxybutyl (meth)acrylate, allyl alcohol or methallyl alcohol may be combined with isocyanato group-containing monomers such as vinyl isocyanate or isopropenyl isocyanate. Other combinations will be apparent to those skilled in the art.

Monomer mixtures forming the microgels may contain monomers having a functional group which may react with the cross-linking agent. Examples of such monomers include acrylic acid, methacrylic acid, 2-hydroxyethyl (meth)acrylate, 2-hydroxypropyl (meth)acrylate, hydroxybutyl (meth)acrylate, allyl alcohol, methallyl alcohol, acrylamide, methacrylamide and the like.

The microgel particles may be of uniform structure or multilayer structure. In the latter case, chemical or physical functions to be played by the microgels as a whole may be shared by different layers.

The microgel particles must have a colloidal size from 0.01 to 10 microns, preferably from 0.02 to 5 microns.

The proportion of the microgels in the coating composition ranges from 0.2 to 30%, preferably from 1 to 20% by weight of the total solid contents thereof. If the amount of microgels is too low, the composition tends to run when applied as a thick film. Conversely, excessive amounts tend to impair the flatness of the finished coat resulting in a poor finish.

The refraction index of the microgels (nDd) and the refraction index of a clear film formed from the film-forming polymer and the cross-linking agent (nDf) must meet the following relationship:

$$|nDd-nDf| \leq 0.05$$

This difference in refraction index is preferably up to 0.03. If the difference exceeds this limit, it becomes difficult to obtain a top coat having an excellent appearance.

The refraction index of the clear film made from the film-forming polymer and the cross-linking agent (nDf) may be determined by preparing a specimen film of 30 to 50 micron thickness, and measuring the refraction index in a α-bromonaphthalene medium using an Abbe refractometer. The measurement is carried out at 20° C. Similarly, the refraction index of the film-forming polymer itself may be measured by this method.

The refraction index of the microgels (nDd) may be calculated according to the following equation:

$$nDd = \Sigma c_1 n_1, c_2 n_2 \ldots c_m n_m$$

wherein $C_1, C_2 \ldots c_m$ represent weight fractions of individual comonomers forming the microgels, and $n_1, n_2, n_2 \ldots n_m$ represent refraction indexes of homopolymers of individual comonomers forming the microgels measured at 20° C.

The organic liquid diluent used in the coating composition of the present invention may be any conventional solvent used in the coating industry for dissolving vehicle resins. Examples thereof include aliphatic hydrocarbons such as hexane, heptane; aromatic hydrocarbons such as toluene and xylene; various petroleum fractions having a suitable boiling point range; esters such as butyl acetate, ethylene glycol diacetate and 2-ethoxyethyl acetate; ketones such as acetone, methyl ethyl ketone and methyl isobutyl ketone; alcohols such as butanol; and mixtures of these solvents. Selection of suitable diluents must be made depending upon the particular film-forming polymer and the form of solvent-polymer mixture, i.e. whether it is solution or dispersion. When the system contains a free isocyanate, the use of solvents containing active hydrogen atoms should be avoided.

The coating composition of the present invention may contain, in addition to hereinbefore described ingredients, other conventional additives as required. Examples thereof include viscosity adjusting agents such as organic montmorillonite, polyamide and polyethylene wax; surface conditioners such as silicones and organic polymers; catalysts such as p-toluenesulfonic acid; UV absorbing agents, hindered amines and hindered phenols.

The coating composition of the present invention may be compounded in any convenient manner. Normally a varnish is prepared first from the film-forming polymer and the diluent. Then the remaining components are incorporated to the varnish and thoroughly dispersed therein. Finally the mixture is diluted to a suitable viscosity with the diluent. When a polyisocyanate cross-linking agent is employed, it is stored in a separate container and mixed well with other components upon use.

The color coat, of course, must contain suitable pigments such as titanium dioxide, iron oxide pigments, chromium oxides, lead chromate, carbon black, phthalocyanine blue, phthalocyanine green, carbazole violet, anthrapyrimidine yellow, flavanthrone yellow, isoindoline yellow, indanthrone blue, quinacridone red and violet, perylene red and the like. Extender pigments such as talc and kaolin may also be incorporated. For metallic coatings, the composition additionally contains metallic flake pigments such as aluminum flakes, copper flakes and other metallic pigments. These pigments can occupy from 5 to 50% by weight of the total solid contents of the composition.

The clear composition may be applied on a substrate or a base coat wet-on-wet and then cured at room or elevated temperature depending upon the type of cross-linking agent used to give a relatively thick transparent coating having an excellent appearance.

Similarly, the pigmented composition may be used to give a relatively thick color coating. The finished coat exhibits an excellent appearance in terms of gloss even in upstanding areas such as automobile doors.

The following examples illustrate the invention. All parts and percentages are on a weight basis unless otherwise specified.

EXAMPLES

PREPARATION OF EMULSIFIER

To a two liter flask having stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azoetropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hyxroxyl number of 90 and a number average molecular weight ($\overline{Mn}$) of 1054 was obtained.

This polyester emulsifier was used in the preparation of microgels.

PREPARATION OF MICROGELS

Microgel A

To a one liter flask provided with stirring means, cooling means and temperature-control means were added 232 parts of deionized water, 10 parts of the above-described emulsifier and 0.75 parts of diethanolamine at 80° C. The mixture was stirred to make a solution. To the solution were added a solution of 4.5 parts of azobiscyanovaleric acid and 4.3 parts of dimethylethanolamine in 45 parts of deionized water. Then a monomer mixture consisting of 65.0 parts of methyl methacrylate, 97.2 parts of n-butyl acrylate, 73.4 parts of styrene, 25.0 parts of 2-hydroxyethyl acrylate and 9.5 parts of ethylene glycol dimethacrylate was added dropwise over 60 minutes. After the addition of monomers, a solution of 1.5 parts of azobiscyanovaleric acid and 1.4 parts of dimethylethanolamine in 15 parts of deionized water was added. The mixture was stirred at 80° C. for 60 minutes to give a polymeric emulsion having a nonvolatile content of 45%, a pH of 7.2 and a viscosity of 92 cps (25° C.).

This emulsion was spray dried to obtain microgel particles having a particle size of 0.8 microns (Microgel A). The refraction index of Microgel A was calculated as described to be 1.512.

The refraction indexes of homopolymers of respective monomers are as follows:

| | |
|---|---|
| Polymethyl methacrylate | 1.489 |
| Polystyrene | 1.591 |
| Poly(ethylene glycol dimethacrylate) | 1.506 |
| Poly(n-butyl acrylate) | 1.466 |
| Poly(2-hydroxyethyl methacrylate) | 1.512 |

Microgel B

Using the same procedure, microgel particles having a particle size of 1.2 microns were prepared from a monomer mixture consisting of 190 parts of methyl methacrylate, 56 parts of n-butyl acrylate and 24 parts of ethylene glycol dimethacrylate. The refraction index was calculated as 1.485.

Microgel C

Using the same procedure, microgel particles having a particle size of 1.0 micron were produced from a monomer mixture consisting of 243 parts of n-butyl methacrylate and 27 parts of ethylene glycol dimethacrylate. The refraction index was calculated as 1.470.

Microgel D

Using the same procedure, a polymeric emulsion was prepared from a monomer mixture consisting of 216 parts of styrene, 27 parts of n-butyl acrylate and 27 parts of ethylene glycol dimethacrylate. Then water in the emulsion was removed by azeotropic distillation and replaced with xylene to a microgel content of 40%. The particle size was 0.2 microns and the refraction index was 1.571.

Microgel E

To a flask as used above were added 232 parts of deionized water, 10 parts of the above-described emulsifier and 0.75 parts of dimethylethanolamine. The mixture was stirred at 80° C. to make a solution. To the solution were added a solution of 1.0 parts of azobiscyanovaleric acid and 0.26 parts of dimethylethanolamine in 20 parts of deionized water. Then a monomer mixture consisting of 108 parts of methyl methacrylate and 27 parts of ethylene glycol dimethacrylate was added dropwise over 60 minutes. The mixture was stirred for additional 60 minutes at 80° C.

A solution of 0.5 parts of azobiscyanovaleric acid and 0.3 parts of dimethylethanolamine in 25 parts of water was added again to the reaction mixture. Then a monomer mixture consisting of 9.5 parts of styrene, 20 parts of methyl methacrylate, 14 parts of n-butyl acrylate and 6 parts of ethylene glycol dimethacrylate was added dropwise over 60 minutes. A solution of 1.5 parts of azobiscyanovaleric acid and 1.4 parts of dimethylethanolamine in 15 parts of deionized water was added and the mixture stirred for 60 minutes at 80° C. An emulsion having a nonvolatile content of 45%, a pH of 7.2, a viscosity of 105 cps (25° C.) and a particle size of 0.2 microns was obtained.

Water in the emulsion was removed and replaced with xylene as before to give a microgel dispersion in xylene having a microgel content of 40% and a particle size of 0.25 microns. The microgel particles consisted of a core having a refraction index of 1.49 and a shell having a refraction index of 1.559. The overall refraction index was 1.527.

PREPARATION OF FILM-FORMING POLYMERS

Acrylic Varnish A

To a reactor provided with a stirrer, temperature-control means and a reflux condenser were added 80 parts of xylene, 10 parts of methyl isobutyl ketone and 20 parts of a monomer mixture having the following composition:

| | |
|---|---|
| Methacrylic acid | 1.8 parts |
| Methyl methacrylate | 39.4 parts |
| Ethyl acrylate | 43.6 parts |
| Isobutyl acrylate | 3.2 parts |
| 2-Hydroxyethyl acrylate | 12.0 parts |
| Azobisisobutyronitrile | 1.5 parts |

The mixture was heated to reflux with stirring and the remaining 81.5 parts of the above monomer mixture were added dropwise over 3 hours. After the addition of a solution of 0.3 parts of azobisisobutyronitrile in 10 parts of xylene for 30 minutes, the mixture was refluxed for additional two hours with stirring. An acrylic varnish having a nonvolatile content of 50% and an $\overline{Mn}$ of 18000 was obtained.

A dry specimen film of 35 micron thickness prepared from this varnish possessed a refraction index of 1.479.

Acrylic Varnish B

To a reactor as above were added 57 parts of xylene, 6 parts of n-butanol and 20 parts of a monomer mixture having the following composition:

| | |
|---|---|
| Styrene | 30.0 parts |
| 2-Ethylhexyl methacrylate | 45.2 parts |
| 2-Ethylhexyl acrylate | 5.5 parts |
| 2-Hydroxyethyl methacrylate | 16.2 parts |
| Methacrylic acid | 3.1 parts |
| Azobisisobutyronitrile | 4.0 parts |

The mixture was heated to reflux with stirring and the remaining 84 parts of the monomer mixture were added dropwise over 2 hours. After the addition of a solution of 0.5 parts of azobisisobutyronitrile in 23 parts of xylene and 14 parts of n-butanol for 20 minutes, the mixture was refluxed for additional two hours with stirring. An acrylic varnish having a nonvolatile content of 50% and an $\overline{Mn}$ of 18000 was obtained.

A dry specimen film of 35 micron thickness prepared from Acrylic Varnish B possessed a refraction index of 1.521.

Polyester Varnish A

To a reactor provide with a stirrer, temperature control means and a decanter were charged with the following reactants:

| | |
|---|---|
| Ethylene glycol | 39 parts |
| Neopentyl glycol | 130 parts |
| Azelaic acid | 236 parts |
| Phthalic anhydride | 186 parts |
| Xylene | 30 parts |

The mixture was heated with stirring until an acid number of 150 was reached while removing the resulting water as an azeotropic mixture with xylene. The mixture was cooled to 140° C. and 314 parts of CARDURA E-10 (glycidyl versatate, Shell Chemical Company) were added. The reaction was continued for additional 2 hours with stirring. A polyester resin having an acid number of 9, a hydroxyl number of 90 and an $\overline{Mn}$ of 1050 was obtained. This resin was diluted with xylene to a nonvolatile content of 60% to give Polyester Varnish A having a Gardner viscosity Y. A dry specimen film prepared from this varnish possessed a refraction index of 1.532.

Polyester Varnish B

To a reactor provided with a stirrer, temperature control means and a decanter were charged with the following ingredients:

| | |
|---|---|
| Coconut Oil | 130 parts |
| Trimethylolpropane | 117 parts |
| Dibutyltin oxide | 0.17 parts |

The reactants were heated under nitrogen gas current at 220° C. for 20 minutes for transesterification.

After cooling, the following reactants were added:

| | |
|---|---|
| Phthalic anhydride | 173 parts |
| Isophthalic acid | 83 parts |
| CARDURA E-10 | 50 parts |
| Neopentyl glycol | 53 parts |

The temperature was raised to reflux (about 180° C.) and then gradually to 230° C. over 3 hours while removing the resulting water as an azeotropic mixture with xylene until an acid number of 8 was reached. After cooling, the product was diluted with 77 parts of xylene and 77 parts of SOLVESSO 100 to give Polyester Varnish B having a nonvolatile content of 60%, a hydroxyl number of 80 and an $\overline{Mn}$ of 2400. The refraction index of a dry specimen film was determined as 1.532.

PREPARATION OF CLEAR TOP COAT

EXAMPLE 1

| | Clear Top Coat[1] | | |
|---|---|---|---|
| | Example 1 | | |
| | A | B | C |
| Acrylic Varnish A | 100 parts | 100 parts | 100 parts |

-continued

| Clear Top Coat[1] | | | |
|---|---|---|---|
| U-VAN 20SE-60[2] | 34 parts | 34 parts | 34 parts |
| Microgel D | 9.0 parts | — | — |
| Microgel C | — | 3.6 parts | — |
| MODAFLOW[3] | 0.2 parts | 0.2 parts | 0.2 parts |

| Example 2 | | | |
|---|---|---|---|
|  | D | E | F |
| Acrylic Varnish B | 100 parts | 100 parts | 100 parts |
| SUPER BECKAMINE L-117-60[4] | 56 parts | 56 parts | 56 parts |
| Microgel C | 9.2 parts | — | — |
| Microgel A | — | 9.2 parts | — |
| TINUVIN 900[5] | 1 parts | 1 parts | 1 parts |
| SANOL LS-292[6] | 1 parts | 1 parts | 1 parts |

| Example 3 | | | |
|---|---|---|---|
|  | G | H | I |
| Polyester Varnish A | 100 parts | 100 parts | 100 parts |
| SUPER BECKAMINE G-821-60[7] | 42 parts | 42 parts | 42 parts |
| Microgel C | 2.5 parts | — | — |
| Microgel A | — | 2.5 parts | — |
| ADDITOL XL-480[8] | 0.2 parts | 0.2 parts | 0.2 parts |

| Example 4 | | | |
|---|---|---|---|
|  | J | K | L |
| Acrylic Varnish B | 100 parts | 100 parts | 100 parts |
| NIKALAC MX-45[9] | 40 parts | 40 parts | 40 parts |
| Microgel C | 7 parts | — | — |
| Microgel E | — | 17.5 parts | — |
| SEESORB #103[10] | 2 parts | 2 parts | 2 parts |
| SANOL LS-770 | 0.5 parts | 0.5 parts | 0.5 parts |
| p-Toluenesulfonic acid | 1 parts | 1 parts | 1 parts |

| Example 5 | | |
|---|---|---|
|  | M | N |
| Acrylic Varnish B | 100 parts | 100 parts |
| DESMODUR N-75[11] | 28.8 parts | 28.8 parts |
| Microgel E | 10 parts | — |
| MODAFLOW | 0.1 parts | 0.1 parts |

| PREPARATION OF BASE COLOR COATS | |
|---|---|
| Base Coat A (metallic color): | |
| ALMATEX NT-448-0 varnish[12] | 100 parts |
| U-VAN 20SE-60 | 15 parts |
| ALUMIPASTE 1109 MA[13] | 13 parts |
| MODAFLOW | 0.3 parts |
| Base Coat B (solid color): | |
| PHTHALKYD 133-60 varnish | 100 parts |
| Titanium dioxide R-5N[14] | 90 parts |
| SUPER BECKAMINE G-821-60 | 31 parts |
| TORAY silicone SH-29[15] | 0.1 parts |

Footnote
[1] Microgel content = 48%
[2] Melamin resin, Mitsui Toatsu Chemicals, Inc., 60% nonvolatile
[3] Monsanto Chemical Co.
[4] Melamin resin, Dainippon Ink And Chemicals, Inc.
[5] UV absorbing agent, Ciba-Geigy AG
[6] Hindered amine, Ciba-Geigy AG
[7] Melamine resin, 60% nonvolatile
[8] Hoechist AG
[9] Melamine resin, Nippon Carbide Co.
[10] Shiraishi Calcium Co.
[11] Polyisocyanate, Bayer AG
[12] Mitsui Toatsu Chemicals Inc.
[13] Toyo Aluminum Co.
[14] Sakai Chemical Industry Co., Ltd.
[15] Toray Industries, Inc.

EVALUATION OF CLEAR TOP COAT

EXAMPLE 1

Clear Top Coat A (Example 1) and B Control were each diluted with a 1:1 mixture of xylene and SWASOL 1000 (Maruzen Oil Co., Ltd.) to a Ford Cup No. 4 viscosity of 25 seconds at 20° C., sprayed onto separate degreased aluminum panels to a dry film thickness of 35 microns in a single spraying using an airless spray gun wider (Iwata Tosoki K.K.), allowed to dry for ten minutes and then baked for 30 minutes at 140° C.

Clear Top Coat A gave a transparent, smooth finish, whereas Clear Top Coat B (Control) gave a rough, opaque finish which degraded the appearance of the aluminum substrate.

Clear Top Coat C was diluted with the same thinner to the same viscosity, sprayed on a glass plate, and treated as described. The fully cured transparent film was stripped from the glass plate. The refraction index was determined as 1.490.

EXAMPLE 2

Metallic Base Coat A was diluted with a thinner (cellosolve acetate:butyl acetate:xylene=50:30:20) to a Ford Cup No. 4 viscosity of 15 seconds at 20° C.

Clear Top Coat D (Example 2), E (Control) and F were each diluted as in Example 1.

Separate degreased tinned sheet iron specimens were coated with the diluted Base Coat A twice to a dry film thickness of 20 microns and then allowed to set at room temperature for 3 minutes. Clear Top Coats D and E were each sprayed onto the base coat wet-on-wet to a dry film thickness of 35 microns, allowed to set 5 minutes and baked at 140° C. for 30 minutes.

A transparent fully cured specimen film was prepared from Clear Top Coat F as in Example 1 for the measurement of refraction index. It was then found to be 1.535.

Clear Top Coat D gave a transparent layer which remarkably improved the esthetic effects of the base metallic coat, whereas Clear Top Coat E gave a slightly opaque, yellowish layer which adversely affected the metallic glamour.

EXAMPLE 3

The procedure of Example 1 was repeated with the use of Clear Top Coats G and H. Similar results were obtained. The refraction index of a cured clear film made from Clear Top Coat I was 1.542.

EXAMPLE 4

Base Coat B (solid color) was applied on two specimen panels as in Example 2.

Clear Top Coats J and K were each applied onto the base coat wet-on-wet to a dry film thickness of 45 microns, allowed to stand for 3 minutes, and baked at 140° C. for 30 minutes.

Clear Top Coat J gave a transparent top layer which contributed to the good appearance of the entire finish, whereas Clear Top Coat K gave a slightly opaque, rough top layer and the entire finish looked as if a one coat finish.

The clear cured film made from Clear Top Coat L was measured to have a refraction index of 1.533.

EXAMPLE 5

The procedure of Example 1 was repeated with the use of Clear Top Coat M. After setting for 10 minutes at room temperature, the film was cured at 100° C. for 30 minutes. A transparent finish having a deep body appearance was obtained.

The refraction index of a transparent specimen film prepared from Clear Top Coat N was 1.537.

PREPARATION OF COLOR TOP COATS

EXAMPLE 6

| | Color Top Coat (solid) | | |
|---|---|---|---|
| | A | B | C |
| Polyester Varnish B | 100 parts | 100 parts | 100 parts |
| Titanium dioxide R-5N | 90 parts | 90 parts | — |
| Xylene | 30 parts | 30 parts | 30 parts |
| SUPER BECKAMINE G-821-60 | 31 parts | 31 parts | 31 parts |
| TORAY Silicone SH-29 | 0.1 parts | 0.1 parts | 0.1 parts |
| Microgel A | — | 5 parts | — |
| Microgel C | 5 parts | — | — |

Polyester Varnish B-titanium dioxide and xylene were thoroughly mixed in a paint conditioner. Then the remaining ingredients were incorporated to the mixture and thoroughly mixed for 2–3 minutes.

EXAMPLE 7

| | Example 7 | | |
|---|---|---|---|
| | Color Top Coat (solid) | | |
| | D | E | F |
| Acrylic Varnish A | 140 parts | 140 parts | 140 parts |
| FASTOGEN blue NK[16] | 4 parts | 4 parts | — |
| Titanium dioxide R-5N | 40 parts | 40 parts | — |
| U-VAN-128[17] | 50 parts | 50 parts | 50 parts |
| MODAFLOW | 0.5 parts | 0.5 parts | 0.5 parts |
| Microgel D | 37.5 parts | — | — |
| Microgel B | — | 37.5 parts | — |

| | Example 8 | | |
|---|---|---|---|
| | Color Top Coat (metallic) | | |
| | G | H | I |
| Acrylic Varnish B | 100 parts | 100 parts | 100 parts |
| U-VAN 20 SE-60 | 50 parts | 50 parts | 50 parts |
| ALUMIPASTE 1109 MA | 12 parts | 12 parts | — |
| Xylene | 12 parts | 12 parts | 12 parts |
| Microgel C | 2 parts | — | — |
| Microgel E | — | 4.4 parts | — |

| | Example 9 | | |
|---|---|---|---|
| | Color Top Coat (solid) | | |
| | J | K | L |
| Polyester varnish B | 100 parts | 100 parts | 100 parts |
| Titanium dioxide R-5N | 90 parts | 90 parts | — |
| Xylene | 30 parts | 30 parts | 30 parts |
| TORAY silicone SH-29 | 0.1 parts | 0.1 parts | 0.1 parts |
| Microgel A | — | 5 parts | — |
| Microgel C | 5 parts | — | — |
| DESMODUR N-75 | 27 parts | 27 parts | 27 parts |

Footnote
[16]Organic pigment, Dainippon Ink And Chemicals, Inc.
[17]Melamine resin, 60% nonvolatile content, Mitsui Toatsu Chemicals, Inc.

EVALUATION OF COLOR TOP COAT

Each coating composition was diluted with a thinner (xylene:SOLVESSO 100:butyl acetate : MEK=40:30:15:15) to a Ford Cup No. 4 viscosity of 20 seconds (solid) or 16 seconds (metallic) at 20° C.

Two phosphated steel panels which were previously given an electrochemically deposited cation coating and a middle coating were used for each coating composition. In one series, all operations including spraying, setting and baking were carried out while the panels were placed in a horizontal position, while, in the other series, panels were placed in a vertical position. In both series, each composition was sprayed twice to a dry film thickness of 35–40 microns, set for 10 minutes at 20-25° C., and baked at 140° C. for 30 minutes except for metallic coat at 80° C. for 30 minutes.

Color top coats containing microgels having a refraction index close to ($\leq 0.05$) that of surrounding matrix (Clear Top Coat A, D, G, J) gave an excellent finish in both horizontal and vertical positions, whereas controls (B, E, H, K) containing microgels having a refraction index significantly different ($>0.05$) from that of the surrounding matrix gave a poor appearance particularly in vertical areas where the coating was subjected to a shear force.

Table I and II below collectively show the results of Examples 1–5 and 6–9, respectively.

TABLE I

| | Clear Top Coat | | | | | | | | |
|---|---|---|---|---|---|---|---|---|---|
| | Example No. | | | | | | | | |
| | 1 | | 2 | | 3 | | 4 | | 5 |
| | Composition | | | | | | | | |
| | A | B | D | E | G | H | J | K | M |
| nD, Matrix | 1.490 | 1.490 | 1.535 | 1.535 | 1.542 | 1.542 | 1.533 | 1.533 | 1.537 |
| nD, Microgel | 1.571 | 1.470 | 1.470 | 1.512 | 1.512 | 1.485 | 1.525 | 1.470 | 1.525 |
| ΔnD | 0.020 | 0.079 | 0.023 | 0.065 | 0.030 | 0.057 | 0.008 | 0.063 | 0.012 |
| Transparency | Good | Opaque | Good | Opaque | Good | Opaque | Good | Opaque | Good |
| Gloss | Good | Not Good | Good | Not Good | Good | Not Good | Good | Not Good | Good |

TABLE II

| | Color Top Coat | | | | | | | |
|---|---|---|---|---|---|---|---|---|
| | Example No. | | | | | | | |
| | 6 | | 7 | | 8 | | 9 | |
| | Composition | | | | | | | |
| | A | B | D | E | G | H | J | K |
| nD, Varnish | 1.532 | 1.532 | 1.479 | 1.479 | 1.521 | 1.521 | 1.532 | 1.532 |
| nD, Matrix | 1.542 | 1.542 | 1.491 | 1.491 | 1.535 | 1.535 | 1.542 | 1.542 |
| nD, Microgels | 1.516 | 1.470 | 1.486 | 1.571 | 1.559 | 1.470 | 1.516 | 1.470 |
| ΔnD | 0.022 | 0.072 | 0.005 | 0.080 | 0.024 | 0.065 | 0.026 | 0.072 |
| Appearance | | | | | | | | |
| Horizontal | | | | | | | | |
| Visual[18] | O | Δ | O | X | O | X | O | Δ |
| Gloss[19] | 94 | 83 | 92 | 81 | 92 | 82 | 97 | 85 |
| PGD[20] | 0.9 | 0.6 | 0.9 | 0.5 | 0.8 | 0.4 | 1.0 | 0.6 |
| Vertical | | | | | | | | |
| Visual | O | X | O | X | O | X | O | X |
| Gloss | 90 | 80 | 89 | 78 | 88 | 79 | 95 | 81 |
| PGD | 0.8 | 0.4 | 0.8 | 0.3 | 0.7 | 0.3 | 0.9 | 0.5 |
| Shear[21] | O | X | O | X | O | X | O | X |

TABLE II-continued

| | Color Top Coat | | | |
|---|---|---|---|---|
| | Example No. | | | |
| | 6 | 7 | 8 | 9 |
| | Composition | | | |
| | A B | D E | G H | J K |
| dullness | | | | |

Footnote
(18)Visually determined.
O: Good
Δ: Fair
X: Not Good
(19)Data measured by a digital glossmeter at 60°, Suga Shikenki K.K.
(20)Data measured by a portable visibility glossmeter sold by Nippon Shikisai Kenkyusho.
(21)Visually determined.
O: Good
Δ: Fair
X: Not Good

We claim:

1. In a coating composition for use as a clear top coat comprising:
   (a) a film-forming polymer having a plurality of cross-linkable functional groups,
   (b) a volatile, organic liquid diluent capable of carrying said film-forming polymer,
   (c) a cross-linking agent dissolved in said diluent, and
   (d) microgel particles of 0.01 to 10 micron particle size of an internally cross-linked polymer which are insoluble in the mixture of said film-forming polymer, said diluent and said cross-linking agent but stably dispersible in said mixture, the proportion of said microgel particles ranging from 0.2 to 30% by weight of the total solid contents of said composition, the improvement wherein said microgel particles are produced by emulsion-polymerizing a mixture of ethylenically unsaturated comonomers including at least one cross-linking comonomer having a formulation which is so preselected as to satisfy the relationship:

$$|nDd - nDf| \leq 0.05$$

wherein nDd is the refraction index of said microgel particles, and nDf is the refraction index of a clear film formed from said film-forming polymer and said cross-linking agent.

2. The coating composition according to claim 1 further comprising a pigment.

3. The coating composition according to claim 1, wherein said film forming polymer is an acrylic copolymer having a plurality of hydroxyl groups, carboxylic groups, or both 4. The coating composition according to claim 1, wherein said film-forming polymer is a polyester resin.

5. The coating composition of claim 1, wherein said film-forming polymer is dissolved in said diluent.

6. The coating composition of claim 1, wherein said film-forming polymer is dispersed in said diluent.

7. The coating composition of claim 1, wherein said film-forming polymer is partly dissolved and partly dispersed in said diluent.

8. The coating composition of claim 1, wherein said cross-linking agent is an aminoplast resin.

9. The coating composition of claim 1, wherein said cross-linking agent is a polyisocyanate.

10. The coating composition of claim 1 which is a clear top coat to be applied onto a base coat wet-on-wet and cured simultaneously.

11. The coating composition of claim 2 which is pigmented with a solid color pigment.

12. The coating composition of claim 2 which is pigmented with a metallic pigment.

13. In a method of forming a multicoat on a substrate comprising the steps of applying a color base coat composition on said substrate, applying thereover a clear top coat composition wet-on-wet and curing both coats simultaneously, the improvement wherein the clear top coat composition is a coating composition according to claim 1.

14. In a method of forming a colored top coat on a substrate comprising the steps of applying a color top coat composition on said substrate and curing the same, the improvement wherein said color top coat composition is the composition of claim 2, and after applying, said composition is allowed to set before curing.

* * * * *